(12) United States Patent
Le Devehat et al.

(10) Patent No.: US 8,701,317 B2
(45) Date of Patent: Apr. 22, 2014

(54) AURICULAR LIVESTOCK IDENTIFICATION TAG

(75) Inventors: Yannick Le Devehat, Trois-Rivieres (CA); Bernard Lefebvre, Quebec (CA)

(73) Assignee: Pluritag Inc., Quebec (CA)

( * ) Notice: Subject to any disclaimer, the term of this patent is extended or adjusted under 35 U.S.C. 154(b) by 0 days.

(21) Appl. No.: 13/990,769

(22) PCT Filed: Dec. 1, 2011

(86) PCT No.: PCT/CA2011/050742
§ 371 (c)(1),
(2), (4) Date: May 30, 2013

(87) PCT Pub. No.: WO2012/071670
PCT Pub. Date: Jun. 7, 2012

(65) Prior Publication Data
US 2013/0247433 A1 Sep. 26, 2013

Related U.S. Application Data

(60) Provisional application No. 61/419,461, filed on Dec. 3, 2010.

(51) Int. Cl.
*G09F 3/00* (2006.01)
*A01K 11/00* (2006.01)

(52) U.S. Cl.
CPC .................................. *A01K 11/001* (2013.01)
USPC ............................................. 40/302; 40/668

(58) Field of Classification Search
CPC ... A01K 11/00; A01K 11/001; A01K 11/004; A01K 11/006; G09F 3/06
USPC ............ 40/300, 301, 302; 24/16 PB; 119/655
See application file for complete search history.

(56) References Cited

U.S. PATENT DOCUMENTS

| 4,441,233 | A | * | 4/1984 | Swift .......................... 24/16 PB |
| RE31,632 | E | | 7/1984 | Murphy et al. |
| 4,491,458 | A | | 1/1985 | Sunter |
| 4,597,208 | A | | 7/1986 | Chevillot |
| 4,633,606 | A | | 1/1987 | Cohr |
| D290,775 | S | | 7/1987 | Scott |
| 4,718,697 | A | | 1/1988 | van Amelsfort |
| 4,739,565 | A | | 4/1988 | Reggers |
| D299,038 | S | | 12/1988 | Van Amelsfort |

(Continued)

FOREIGN PATENT DOCUMENTS

| EP | 1575004 | 9/2005 |
| GB | 2037236 | 7/1980 |

(Continued)

*Primary Examiner* — Joanne Silbermann
(74) *Attorney, Agent, or Firm* — Norton Rose Fulbright Canada LLP.; Alexander Daoust

(57) ABSTRACT

The auricular livestock identification tag comprising a male portion having a head at an end of a narrower stem, the head protruding laterally from the stem by an abutment ledge, and a female portion having an annular body with an axial aperture, and an insertion side opposite an exposure side, and a plurality of resilient abutment members extending inwardly from the annular body into the axial aperture, the abutment members being flexible to allow penetration of the head through the axial aperture from the insertion side to the exposure side, and resilient so as to return toward its original position, and under the abutment ledge, after said penetration, to thereafter prevent retraction of the head through the axial aperture.

17 Claims, 7 Drawing Sheets

(56) References Cited

U.S. PATENT DOCUMENTS

| | | |
|---|---|---|
| 4,864,750 A | 9/1989 | Reggers |
| 4,953,313 A | 9/1990 | Scott |
| D325,268 S | 4/1992 | Wittick et al. |
| D389,616 S | 1/1998 | Van Amelsfort |
| 5,923,300 A | 7/1999 | Mejia |
| 6,400,338 B1 | 6/2002 | Mejia et al. |
| 6,666,170 B1 | 12/2003 | Hilpert |
| 6,708,432 B2 * | 3/2004 | Haar et al. ............ 40/301 |
| 7,316,691 B2 | 1/2008 | Eadie |
| 7,467,760 B2 | 12/2008 | Schieli et al. |
| D591,012 S | 4/2009 | Geissler |
| 7,528,725 B2 | 5/2009 | Stewart |
| 7,619,522 B2 | 11/2009 | Geissler |
| 7,726,055 B2 | 6/2010 | Costantini |
| 7,825,770 B2 | 11/2010 | Postelwait et al. |
| 7,837,694 B2 | 11/2010 | Tethrake et al. |
| 7,854,079 B2 | 12/2010 | Hilpert |
| 7,879,079 B2 | 2/2011 | Geissler et al. |
| 8,099,884 B2 | 1/2012 | van Wijk et al. |
| 2006/0049949 A1 | 3/2006 | Jurs et al. |
| 2010/0127830 A1 | 5/2010 | Nielsen et al. |
| 2010/0132233 A1 | 6/2010 | Hilpert |
| 2010/0265037 A1 | 10/2010 | Domsten et al. |
| 2010/0320274 A1 | 12/2010 | Nielsen et al. |

FOREIGN PATENT DOCUMENTS

| | | |
|---|---|---|
| GB | 2160153 | 12/1985 |
| WO | 9803056 | 1/1998 |
| WO | 02082891 | 10/2002 |
| WO | 2007042528 | 4/2007 |
| WO | 2009034058 | 3/2009 |
| WO | 2009074659 | 6/2009 |
| WO | 2009127541 | 10/2009 |
| WO | 2009127542 | 10/2009 |
| WO | 2009140968 | 11/2009 |
| WO | 2010009983 | 1/2010 |
| WO | 2010069955 | 6/2010 |
| WO | 2010072689 | 7/2010 |

* cited by examiner

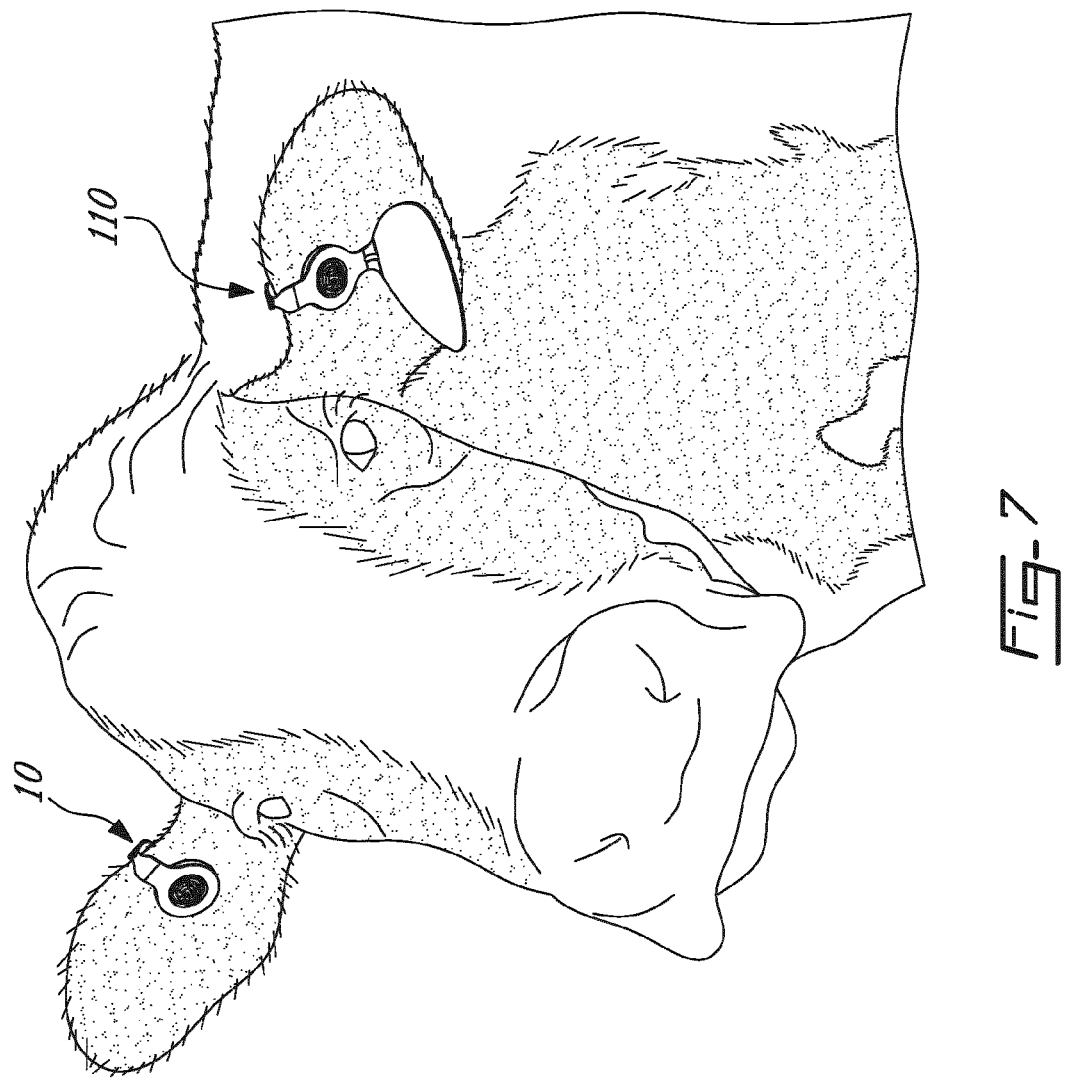

AURICULAR LIVESTOCK IDENTIFICATION TAG

BACKGROUND

The use of auricular tags (ear tags) in the identification of cattle has been known for many years, and were typically known to generally include a male portion which was punched through the ear of the animal, into a female portion, with the ear trapped between the two.

There were many problems or limitations related to formerly known auricular tags. For instance:

A. There was a challenge in providing a product having certain feature combinations such as a maximal insertion force, to allow hand installation by an average farmer, while maintaining both a minimal extraction force, to prevent undesired retraction of the male portion, and a maximal extraction force to ensure breakage.

B. Once the punctured ear was trapped between the two portions, the ear sometimes had healing difficulties which could lead to infection.

C. Some tags could be tampered with and/or fraudulently used in violation with prior agreements.

D. There were challenges in identifying animals from a distance.

E. There were challenges in maintaining costs low for a given set of features of a tag.

F. A substantial amount of skill was required for installing the tag at a position on the ear to be both practical and favour healing.

There thus remained room for improvement.

SUMMARY

Solutions are taught herein, such as:

A. Providing an improved locking mechanism, which can have abutment members which bend at least partially tangentially when subjected to the penetration of the male portion, and/or use specially adapted materials for strategic components, for example.

B. Providing a female portion which has radial air channels, and/or defining an air passage between the female and male portion when engaged.

C. Providing a receptacle which traps a head of the male portion when the tag is broken, the receptacle having apertures allowing visual inspection.

D. Providing an identification panel which is hinged and/or which can include an specially adapted antenna.

E. Providing a design which has a low amount of components, strategically selecting the material of components, and/or providing a more simple assembly method lending itself to efficient mass production.

F. Providing a flexible portion interconnecting the male portion to the female portion and which can facilitate handling and/or be used as a stop against an edge of the ear to assist in correctly positioning the tag.

In accordance with one aspect, there is provided an auricular livestock identification tag, the tag comprising a male portion having a stem, a base at a first end of the stem, the base being wider than the stem, and a head at a second end of the stem, opposite the base, the head being wider than the stem and having an abutment ledge facing the base; and a female portion having an annular body with an axial aperture, an insertion side axially opposite an exposure side, and at least one resilient abutment member extending inwardly from the annular body into the axial aperture, the at least one resilient abutment member being in interference with the head, being flexible to yield upon penetration of the head through the axial aperture from the insertion side to the exposure side, and being resilient so as to return toward an original position after said penetration and thereby become opposable to retraction of the head by abutment against the abutment ledge.

In accordance with another aspect, there is provided a process of making an ear tag, said process comprising: moulding a first half of a female portion; positioning the first half into a mould, positioning a puncture pin into the mould, and over moulding a second half of the female portion over the first half, a stem and base over the puncture pin, and a flexible part interconnecting the base to the second half in a single moulding step.

In accordance with another aspect, there is provided a method of installing an identification tag to an ear of livestock, the identification tag having a male portion and a female portion interconnected by an interconnection portion, the method comprising: placing an internal fold in the interconnection portion against an edge of the ear, with the male portion and the female portion on opposite sides of the ear; and using the internal fold as a distance gauge, puncturing the ear at a predetermined distance from its edge with the male portion and engaging the male portion with the female portion.

In accordance with another aspect, there is provided an auricular livestock identification tag, the tag comprising a male portion having a head at an end of a narrower stem, the head protruding laterally from the stem by an abutment ledge, and a base radially extending from an other end of the stem, opposite the head; and a female portion having an annular body with an axial aperture, and an insertion side opposite an exposure side, and at least one resilient abutment member extending inwardly from the annular body into the axial aperture, the abutment members being flexible to allow penetration of the head through the axial aperture from the insertion side to the exposure side, and resilient so as to return toward its original position, and under the abutment ledge, after said penetration, to thereafter prevent retraction of the head through the axial aperture.

Many further features and combinations thereof concerning the present improvements will appear to those skilled in the art following a reading of the instant disclosure.

DESCRIPTION OF THE FIGURES

In the figures,

FIG. 7 shows an example use of auricular tags.

DETAILED DESCRIPTION

Figure 1:
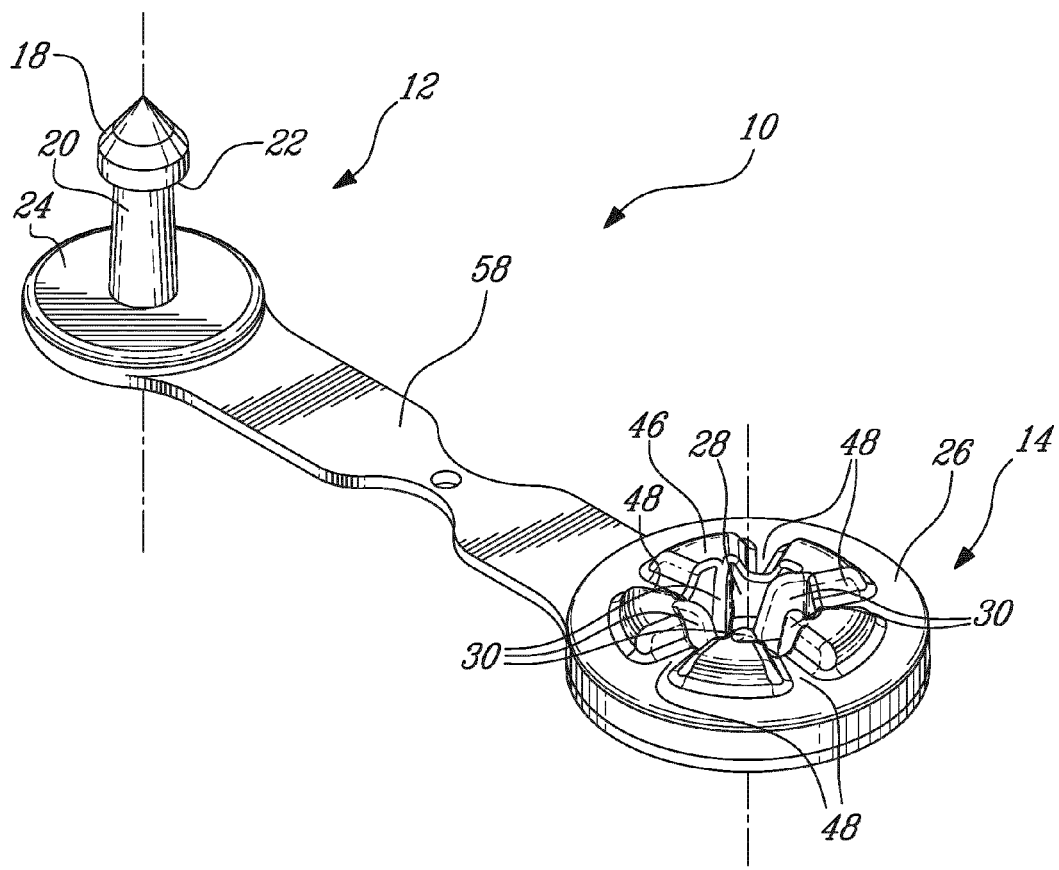
FIG. 1 is an oblique view of an example of an auricular tag

FIG. 1 shows an example of an auricular livestock identification tag 10 having a number of useful features. Generally, the tag 10 can be seen to include a male portion 12 which is configured for engagement with a female portion 14 via a locking mechanism.

More specifically, the male portion 12 has a head 18 at one end of a narrower stem 20, the head has an abutment ledge 22 extending radially around the stem 20, forming a first element of the locking mechanism preventing retraction. The other end of the stem 20 opposite the head 18 is supported at a base 24 which can contribute to limit the penetration depth of the stem 20 by abutment against the ear (not shown).

The female portion 14 is generally comprised of an annular body 26 having an axial aperture 28 which can be generally cylindrical in shape and in which the head 18 of the male portion 12 is to be received. Resilient abutment members 30, provided in the form of flaps connected to the annular body 26 and extending into the axial aperture 28, are provided, forming another element of the locking mechanism. When the male portion 12 is inserted into the female portion 14 axial aperture 28 into the configuration shown in FIG. 2A, the resilient abutment members yield to the head 18 when the head 18 is inserted through the axial aperture 28, and thereafter resiliently return to their original shape into a snapping lock, providing an abutment 32 against the abutment ledge 22 of the head 18 and preventing undesired retraction of the head 18.

Figure 2A:
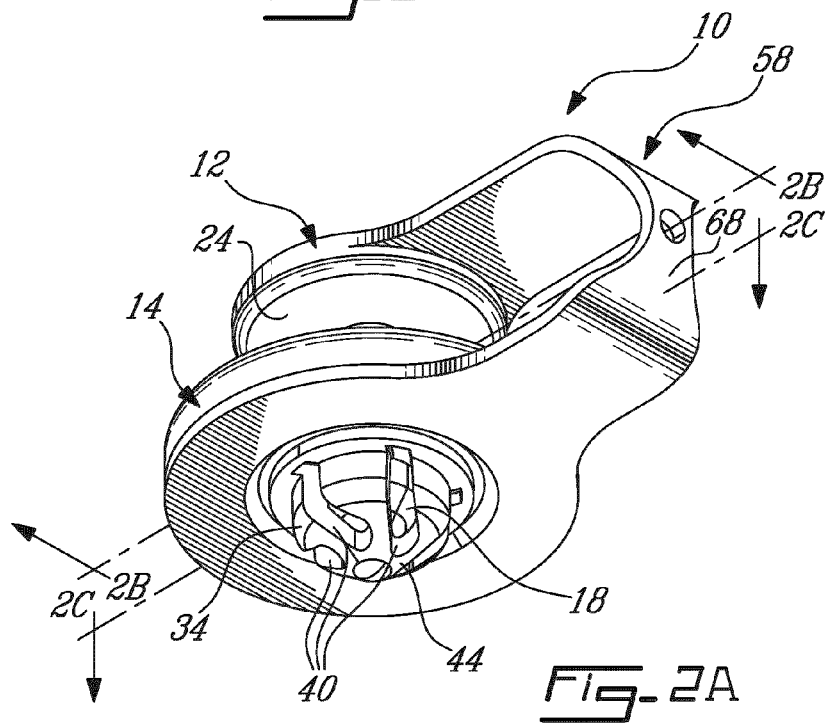
FIG. 2A is another oblique view, showing the auricular tag with two portions engaged; with FIGS. 2B and 2C being taken along corresponding cross-sectional lines thereof.
Figure 2B:
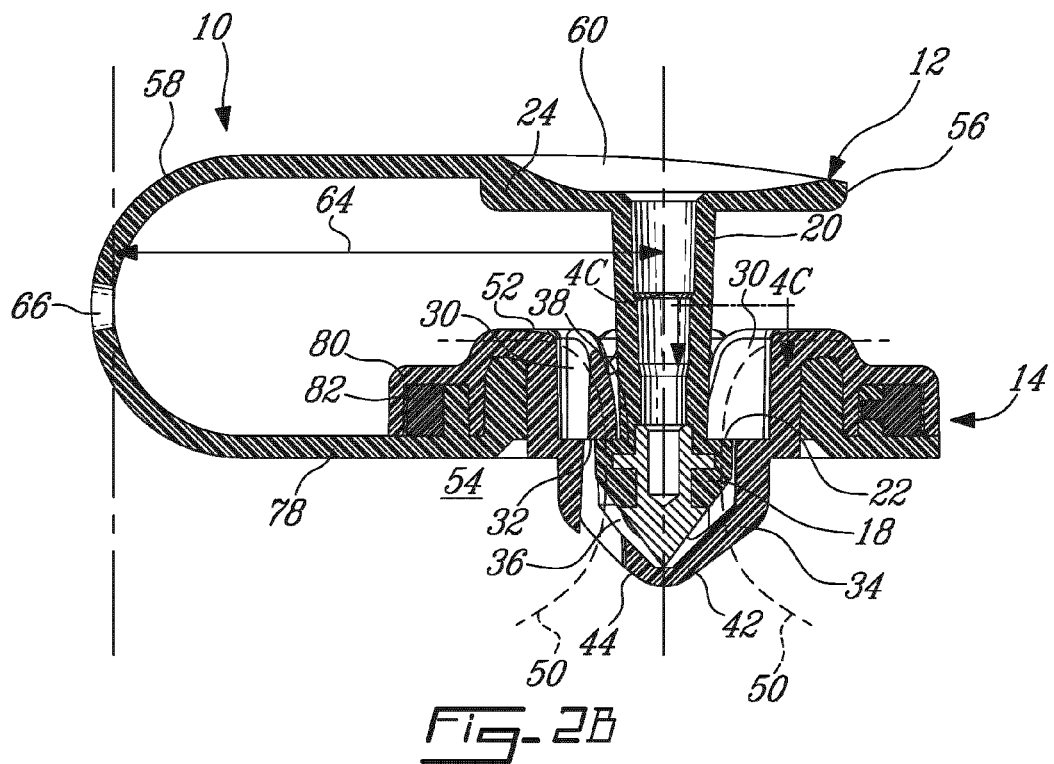
Figure 2C:
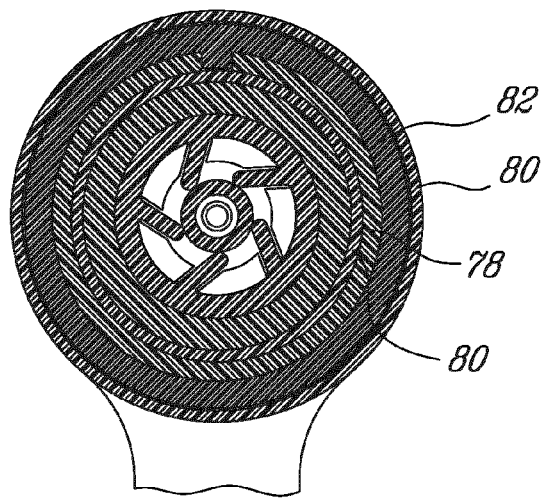

Referring to FIGS. 2A to 2C, it will be noted here that an optional receptacle 34 can be provided as part of the female portion 14, which has a cavity 36 for receiving the head 18. If the male portion 12 is pulled back away from the female portion 14 after it has snappingly locked, with an excessive force, the male member 12 can be configured to break at the stem 20, by designing the stem 20 with an area of structural weakness 38 adjacent the head 18 for instance. Accordingly to this embodiment, if this happens, the head 18 will remain trapped in the receptacle 34. Apertures 40 can be provided through the receptacle 34. Among other possible uses, some of which will be detailed below, the apertures can allow determining the presence or absence of the head 18 in the receptacle 34 by visual inspection.

More specifically, in this particular embodiment, the cavity 36 in the receptacle 34 is sized specifically to receive the head 18, and the apertured wall 42 forming the receptacle 34 can be somewhat elastic to provide a level of flexibility to deformation allowing the head 18 to push a tip 44 of the receptacle 34, allowing the abutment ledge 22 to clear the resilient members 30, and thereafter be snugly trapped between the wall 42 of the receptacle 34 and the resilient members 30. Since the head 18 remains trapped in the receptacle 34 even in the event of breakage of the stem 20, the tag 10 can be said to be tamper-evident. This feature makes the tag 10 difficult to use otherwise than specifically intended by the manufacturer.

Referring back to FIG. 1, the female portion 14 can be seen to be provided with a protruding annular surface 46 in this embodiment, which is designed for abutment against the ear of the animal. The protruding annular surface 46 can be seen to include a plurality of radially-extending channels 48 recessed therein. Henceforth, when the tag 10 is engaged with the ear of the animal, it is in the configuration shown in FIGS. 2A to 2C, and an air circulation path 50 if formed between an insertion side 52 and an exposure side 54 of the female member 14 even if the annular surface 46 is in abutment with the ear (not shown). The air circulation path 50 extends from the radially extending channels 48 in the annular surface 46, through areas located between the resilient members 30, around the stem 20, in the axial aperture 28, and through the apertures 40 in the receptacle 34. This air circulation path 50 can favour healing of the ear after the puncture, the available supply of fresh air helping the wound to dry and the blood to coagulate.

In this embodiment, an optional flexible portion 58 can be used to interconnect the male portion 12 and the female portion 14. Among other uses, there is a handy practical side to having both portions 12, 14 interconnected as it can assist in manipulation of the tag 10 and render the installation of the tag 10 more efficient. In addition to manipulation practicality, the flexible portion 58 in this specific example is provided of a strategic length to provide an abutment depth 64, which is specifically calculated in a manner that when an edge of the ear comes into abutment against a fold 66 of the flexible portion, the male member 12 and female member 14 on opposite sides of the ear are automatically aligned with a relative height of the ear which is predetermined to be "safe" for punching. The expression "safe" is used in this context to refer to a portion of the ear which will typically heal well when punctured. Typically, one will wish to avoid main nerves in the ear and any other particularly sensitive portions. The specific areas to avoid are typically known to persons of skill in the art and can differ depending on the type of animal. Henceforth, the abutment depth 64 of the flexible portion 58 can be adapted to the specific end-use application intended. The flexible portion 58 can thus be used as a stop to significantly improve the ease of installation of the ear tag 10 at a safe position or height on the ear and improve installation efficiency.

However, having both portions 12, 14 interconnected can create an area which can become caught against an obstacle against which the animal would rub its ear, such as barbed wire or the like for instance. If the tag 10 becomes caught with an obstacle, the animal can overreact while attempting to free itself, thereby potentially injuring its ear. In this specific embodiment, this risk is addressed by making the interconnection portion 58 intentionally weak in a manner that the interconnection portion 58 can break easily if caught and pulled beyond a predetermined threshold. In this specific embodiment, the interconnection portion 58 is made intentionally weak by the presence of a narrower weakness section 68 at the fold area 66, at mid-distance between the male portion 12 and the female portion 14. This weakness section 68 can be made even weaker by providing one or more apertures therein as shown.

Even in the absence of an interconnecting portion 58, there is a slight risk that the base 24 of the male portion 12 becomes caught by an obstacle. In the illustrated embodiment, this concern is addressed by designing the base 24 of the male portion 12 to be lean and stealthy as possible, making it more likely to slip by an obstacle than to become caught against it, while performing its interconnection function. One way to reduce risks of trapping is to design the base 24 as small as possible while maintaining it relatively functional. Further, making it flexible can help in allowing it to yield and therefore avoiding to become trapped, this can be achieved by using a flexible material and having a controlled thickness. Also, referring to FIG. 2B, it will be noted that the base 24 of the male portion 12 can also taper toward a narrow end 56, opposite the flexible interconnection portion 58, to further help reducing the risk of the end 56 of the base becoming trapped. Still referring to FIG. 2B, it will be noted that the base 24 of the male portion 20 has a concave recess 60 opposite the stem 20. The concave recess 60 can help in positioning the male portion 12 relative to tooling which is used in installing the tag 10, for instance.

In the example described herein and illustrated, it was desired that the maximal insertion force be sufficiently low to allow an average farmer to install the tag 10 using appropriate manual pliers. Further, the tag can have a minimal extraction force, below which the stem 20 does not break, and a maximal extraction force, above which the stem 20 intentionally breaks. For beef, the minimal extraction force can be equivalent to 32 kilos applied axially, and the maximal extraction force can be of 38 kilos, for instance. Of course, these specific values can vary depending on the actual application. They can be significantly different in the case of sheep for instance. These characteristics can be achieved using the design taught herein, including by careful selection of a combination of material resistance and geometry resistance. The stem 20 can have more than one weakness point, if desired, such as both one adjacent the head 18 and one adjacent the base 24, for instance.

Figure 3A:
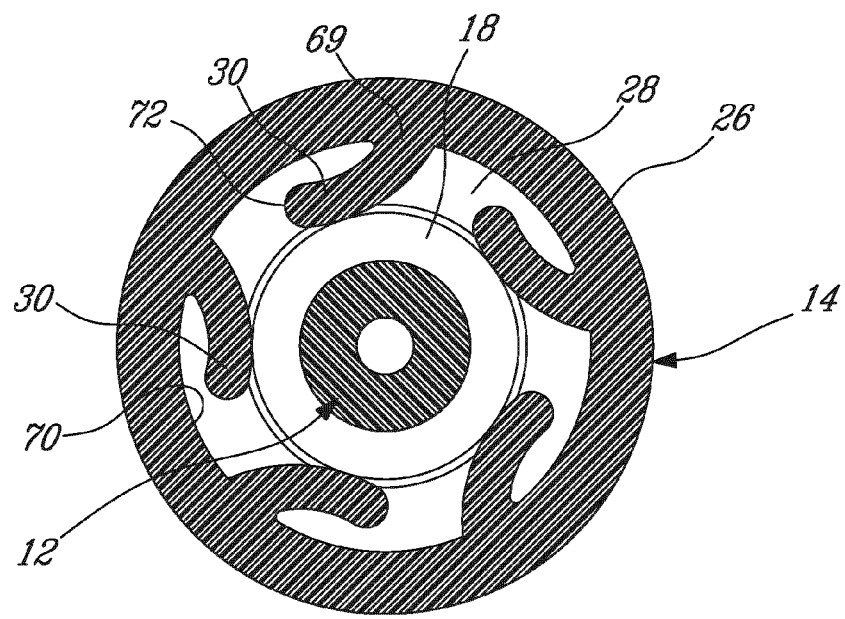
FIGS. 3A and 3B are schematic cross-sectional views showing the penetration of the male portion into the female portion.
Figure 3B:
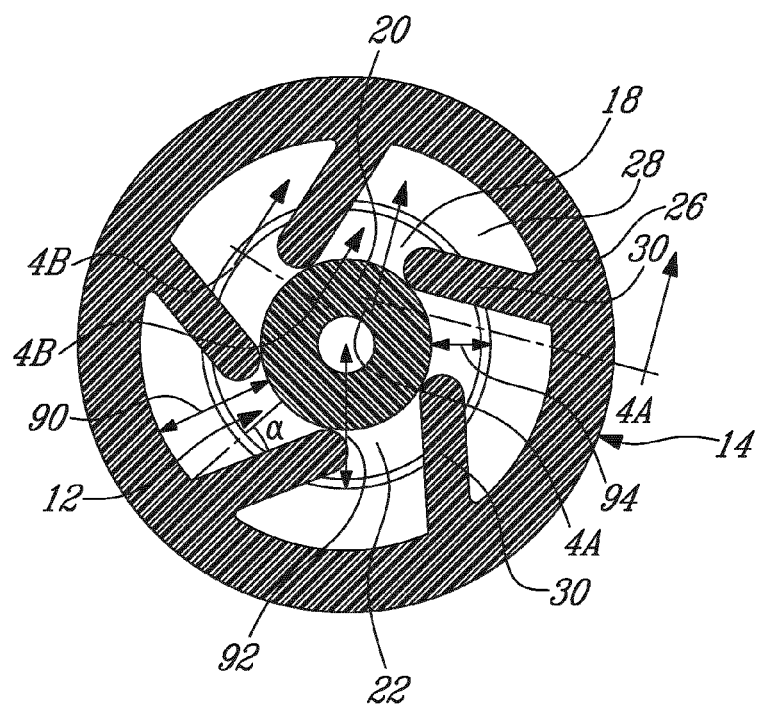

FIGS. 3A and 3B illustrate the interference between the resilient abutment member 30 and the head 18, and the yielding of the resilient abutment members 30 by tangential and radial flexion upon pressure exerted by the conical tip of the head 18 as the head 18 penetrates the axial aperture 28. First, it will be understood that the resilient abutment members 30 are in interference with the head 18 and more specifically with the passage thereof through the axial aperture 28. When the resilient abutment members 30 are in their original position (shown in FIG. 3B) in the absence of an external force, they extend into the axial aperture 28 by an abutment member radial distance 90, leaving a central free area which in this specific case was selected to correspond roughly to the diameter of the stem 20. However, the head 18 has a head radius 92 which is wider than central free area (stem 20) by an interference radius 94. When the axis of the head 18 and the axis of the axial aperture 28 coincide, resilient abutment members 30 are thus in interference with the head 18 in an annular region of the interference radius 94. In this embodiment, when the conical tip of the head 18 is pushed against the resilient members 30 by a sufficient force, the resilient abutment members 30 yield to the passage of the head 18 by resiliently flexing, which occurs at least partially tangentially as shown in FIG. 3A. In this embodiment, the resilient abutment members 30 are inclined from a radial orientation by a given angle $\alpha$ to contribute to the resilient tangential flexing ability. The value of the angle $\alpha$ can vary depending on the application and can be of 0°, 5°, 10° or 20° or more in alternate embodiments, for example. Once the abutment edge 22 of the head 18 clears the resilient members 30, the resilient members recover their original shape as shown in FIG. 3B, thereby snappingly locking the head 18 past the female member 14. More particularly, the presence of the resilient abutment members 30 around the stem 20 opposes eventual retraction of the head 18 by the abutment members 30 providing an abutment against the abutment ledge 22. To this end, the abutment members 30 are flexible, and flat, somewhat panel-like, with one edge 69 connected to a cylindrical inner wall surface 70 of the axial aperture 28 in the female member 14, and a free edge 72 extending in the axial aperture 28, in interference with the head 18. A number of abutment members 30 are used, the exact number of which can vary depending on the application. The abutment members 30 are circumferentially interspaced along the cylindrical inner wall surface 70. Interspacing in a regular manner and using abutment members 30 each having an identical shape to the others can help making the snapping lock feature more predictable.

Figure 4A:
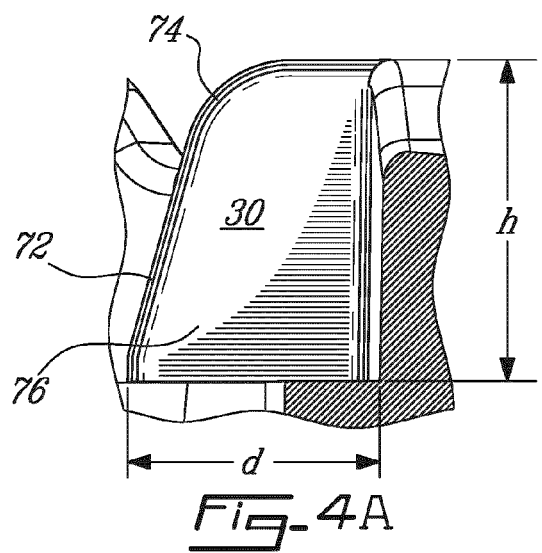
FIGS. 4A to 4C are side, front, and top views, respectively, of a resilient abutment member of the auricular tag.
Figure 4B:
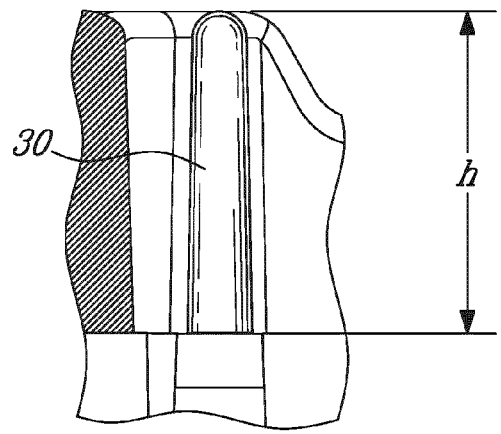
Figure 4C:
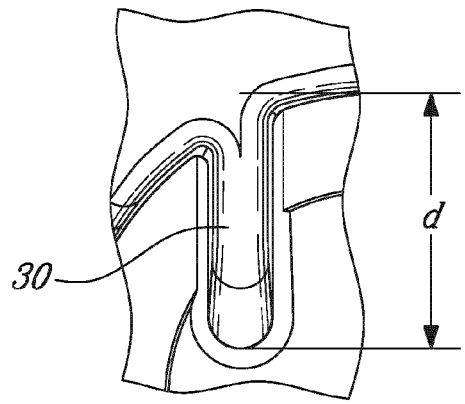

In this embodiment, the head 18 has a conical tip (in this context, the expression "conical" can be understood to encompass pyramidal and truncated shapes) which is placed in abutment against the abutment members collectively, and then by exerting a sufficient force, forces the abutment members to yield. The exact shape of the abutment members which was selected in this particular embodiment is shown in the views provided at FIGS. 4A, 4B, and 4C.

Given that the abutment members 30 extend in a manner which is inclined relative to an radial orientation, the axial pushing of the head 18 against the abutment members 30 will tend to fold the abutment members against the cylindrical inner wall surface 70 on a side toward which it is already inclined. This type of folding deformation is desired in this specific design and is further favoured by the configuration of the abutment members 30 having a height h greater than a depth d, and by the conical configuration of the head 18. Nonetheless, since the force is exerted downwardly, the abutment members 30 will also tend to deform downwardly to a certain extent. This type of deformation is expected to a certain extent, even though its contribution to the locking engagement is debatable. The deformation can be guided to be exerted more in the tangential, folding orientation by the specific configuration as detailed above. In particular, downward deformation can be limited by providing a height h which is greater than the depth d. Further, in this particular example, the tangential deformation is also favoured by the free edge 72 of the abutment members 30 being provided with a downward slope $\beta$, inciting the head 18 to tangentially push the upper edge 74 thereof and the lower edge 76 thereafter being naturally guided tangentially as the head 18 is pushed downwardly. Designing the upper edge 74 in a manner slightly narrower than the lower edge 76 can also contribute to guiding the movement tangentially. It will be understood that the expression downwardly is used freely herein in relation to an axial direction regardless of the orientation of the tag relative to the ground.

Figure 5:
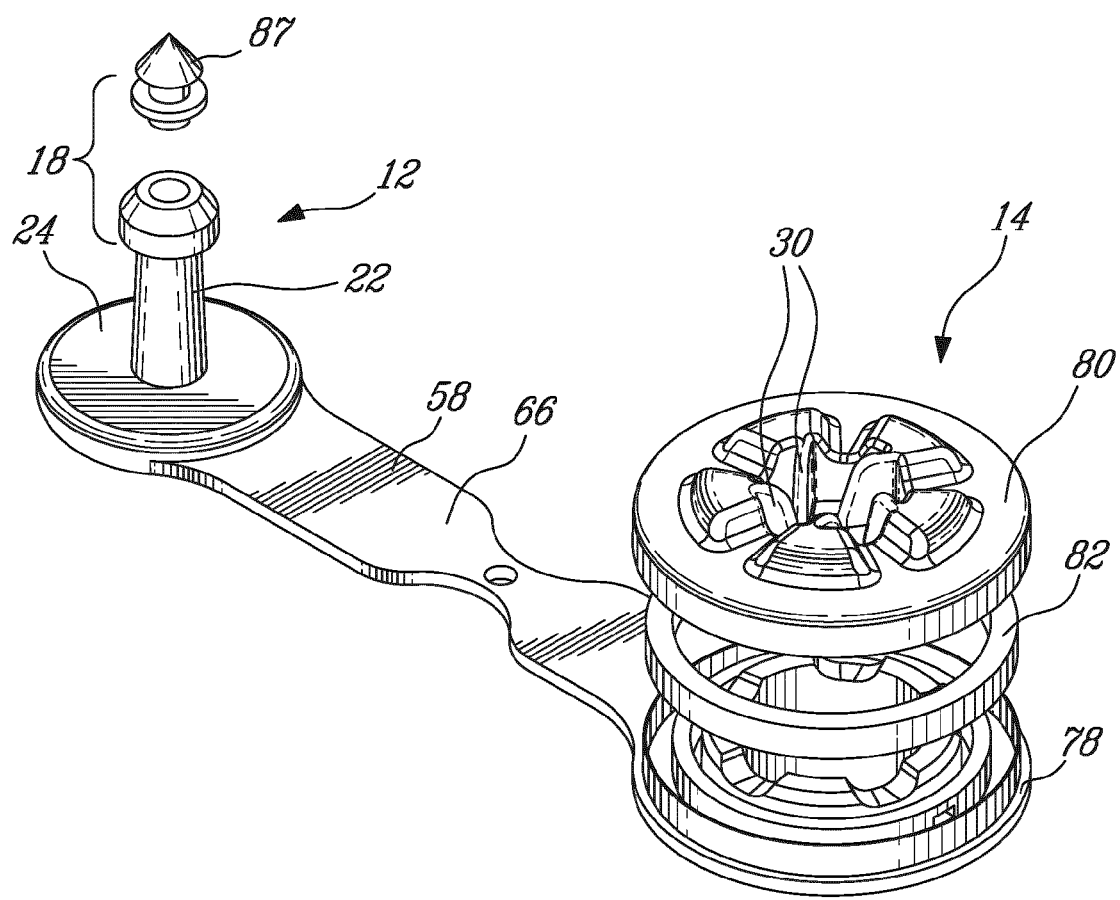
FIG. 5 is an exploded view of the auricular tag.

Referring now FIGS. 5, 2B and 2C, it will be understood that significant advantages of the exemplary ear tag 10 stem from a simplicity of its construction. Exemplary construction features, which will now be described, can aim to favour low costs and/or production throughput. More specifically, referring for now only to construction features of an exemplary the female portion 14 having an optional antenna coil 82 (which can be present even in embodiments where the male portion 12 and the female portion 14 are not interconnected for instance), it can be seen that the female member 14 can be comprised of only three main sub-components, that is: a first half 80, a second half 78, and the annular antenna coil 82 trapped between the two. The annular antenna coil 82 can be a low frequency (LF) antenna coil for instance. Such antenna coils are commonly available, but typically have a limited range. The second half 78 can be assembled to the first half 80 simply by over moulding, i.e. moulding the second half 78 in a mould in which the first half 80 and coil 82 have first been positioned. If the material of the first half 80 and second half 78 is the same, or if they are of compatible material types, they will naturally adhere to one another upon moulding, thereby omitting the need for a step subsequent to moulding, such as ultra-sonic welding or gluing, which can favour low production costs.

Figure 6A:
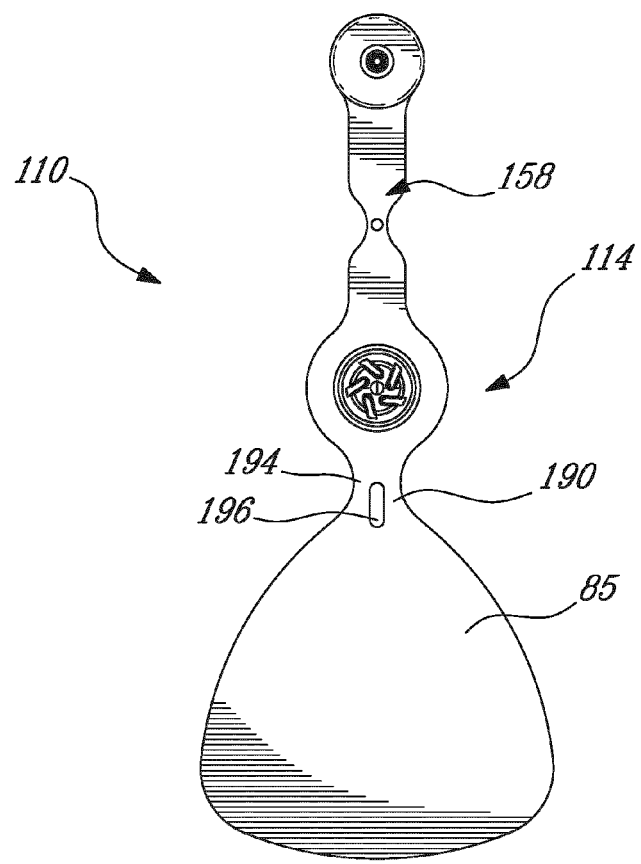
FIGS. 6A and 6B are views of another embodiment of the auricular tag, shown unfolded and folded, respectively.
Figure 6B:
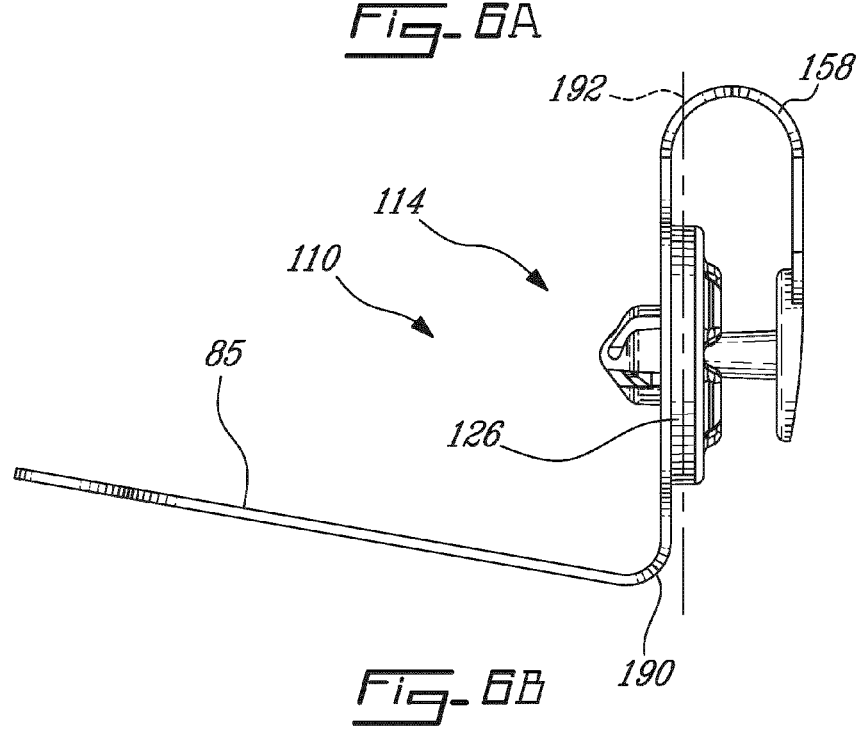

In the specific illustrated embodiment, the first half 80 and the second half 78 are both made of polyether-based thermoplastic polyurethane (TPU). The first half 80 requires significant sturdiness for its intended use in receiving the male member 12, and a TPU of a relatively high hardness can be preferred. In this embodiment, the abutment members 30 and the receptacle 34 (FIG. 2A) are incorporated to the design of the first half 80, all in a single mouldable shape. A cavity can be provided in the first half 80 in a manner that the coil be snappingly held therein to ease handling during manufacturing. Especially in embodiments where the male portion 12 and female portion 14 are interconnected, it can be preferred to use a TPU of a relatively lower hardness in the second half 78 to allow satisfactory folding ability of the flexible portion 66. This flexibility can serve for more than one purpose, for example: it can allow the base 24 of the stem 22 to flex and yield to avoid becoming trapped, it can allow the flexible portion 66 to fold, allowing the male portion 12 to easily reach the female portion 14, and it can allow an optional identification panel 85, such as shown in FIGS. 6A and 6B for instance, to fold. It will be understood that other plastics can be used instead of TPU.

In the example detailed above, to allow producing in a low amount of steps, the male portion 12 can be mainly made of the same material than the interconnection portion 58, which can be of limited hardness for reasons explained above. A puncture pin 87 having a relatively high hardness, adapted to puncturing the ear of the animal, can be used as the tip of the head 18. The puncture pin 87 can be made embedded within the head 18 by overmoulding around an annular rib, as shown, or other locking shape.

Henceforth, in the example production process described herein, a first step is to mould the first half 80, then, the first half 80, puncture pin 87 and coil 82 are positioned in a second mould, and another part, extending from the head 18, along the stem 20, base 24, interconnection portion 58, and to the second half 78 of the female member 14, is overmoulded in the second mould, and can thereby become assembled into an assembly which can be handled as a single component. The puncture pin 87 can be made of a material which is compatible with the application, such as reinforced nylon or coated steel, for instance.

Turning now to FIGS. 6A and 6B, another embodiment of a tag 110 is shown. This example can include all the elements previously described, and can additionally include an identification panel 85 which can be used to provide written markings. In embodiments where an identification panel is used, the annular antenna coil 82 referred to above is not always required and can be omitted.

The identification panel 85 can be provided connected to the female portion 114, opposite the interconnection portion 158, and can optionally be provided with a foldable section 190 to fold the identification panel 85 relatively to the plane 192 of the annular body 126 of the female portion 114. The identification panel 85 can be configured to fold naturally to the vertical under the effect of gravity caused by its own weight. In the particular embodiment illustrated in FIGS. 6A and 6B, this feature is achieved by forming a foldable section 190 in the form of a hinge, which can include a narrow section 194 and a central aperture 196 as shown for instance. The foldable section 190 interconnects the identification panel 85 to the female portion 114 and allows the identification panel 85 to hingedly hang down under the effect of gravity. The fold can be substantially normal to the plane 192 of the annular body 126, such as shown in FIG. 6B. Such a fold can advantageously be used in combination with the particular positioning of the tag on the ear discussed above and which is gauged by using the interconnection portion 158 as a stopper to allow the identification panel to hang in a predetermined position. This is schematized in FIG. 7, and can help in the identification of the animal from a distance by visual inspection when the tag is so positioned on the ear, in a plurality of positions of the head of the animal.

Printing or laser engraving can be performed on a same side on flat portions of the overmoulding (the part of the tag being overmoulded being referred to here as the overmoulding) in a single step, with or without the panel.

Further, the identification panel can further include an antenna such as a UHF antenna, to allow identification of the animal using appropriate instruments. Compared to LF antennas, UHF antennas are likely to allow identification at a significantly greater range. However, the function of UHF antennas, contrary to LF antennas, can be affected by the nearby presence of biological tissues and fluids. The positioning of the tag on the ear of the animal described above and illustrated on FIG. 7, together with the folding of the identification panel, allows spacing of the UHF antenna positioned therein from the ear of the animal, which can control interference and thereby increase reading range, and thereby allow instrumental identification of livestock at much greater ranges than by using only the LF antenna coil.

The examples described above and illustrated are intended to be exemplary only. The scope is indicated by the appended claims.

What is claimed is:

1. An auricular livestock identification tag, the tag comprising:
    a male portion having a stem, a base at a first end of the stem, the base being wider than the stem, and a head at a second end of the stem, opposite the base, the head being wider than the stem and having an abutment ledge facing the base; and
    a female portion having an annular body with an axial aperture, an insertion side axially opposite an exposure side, and at least one resilient abutment member extending inwardly from the annular body into the axial aperture, the at least one resilient abutment member being in interference with the head, being flexible to yield upon penetration of the head through the axial aperture from the insertion side to the exposure side, and being resilient so as to return toward an original position after said penetration and thereby become opposable to retraction of the head by abutment against the abutment ledge;
    wherein the head has a conical tip opposite the stem, and the female portion has a plurality of the at least one resilient abutment member, each resilient abutment member being flat and planar, oriented parallel to an axis of the axial aperture, having a connection edge connected to the annular body at a given one of a plurality of circumferentially interspaced positions, a free edge extending in the axial aperture in said interference with the head, a first axial edge at the insertion side and a second axial edge at the exposure side, providing said abutment against the abutment ledge of the head.

2. The identification tag of claim 1 wherein the abutment members yield to the head by flexing tangentially when the head is pushed axially against the abutment members, into and through the axial aperture.

3. The identification tag of claim 1 wherein the resilient abutment members are inclined from a radial orientation by a given angle.

4. The identification tag of claim 1 wherein the resilient abutment members extend by a depth between the connection edge and the free edge which is smaller than an axial height between the first axial edge and the second axial edge.

5. The identification tag of claim 1 wherein the free edge of the abutment members slopes from the first axial edge to the second axial edge.

6. The identification tag of claim 1 wherein the first axial edge is narrower than the second axial edge.

7. The identification tag of claim 1 further comprising at least one predetermined structural weakness along the stem designed to break when the stem is subjected to an extension force above a predetermined threshold, and a receptacle connected to the exposure side and housing the head once the head is inserted through the aperture, wherein the receptacle has apertures allowing visual access therein.

8. The identification tag of claim 1 wherein the insertion side has a protruding surface for abutment against an ear of the animal during use, the protruding surface having a plurality of air circulation channels providing for circulation of air with the aperture when in said abutment against the ear.

9. The identification tag of claim 8 further comprising a gap between the male member and the female member between the stem and the axial aperture after said penetration, the gap allowing air passage from the insertion side to the exposure side.

10. The identification tag of claim 1 wherein the male portion is connected to female portion by an interconnection portion.

11. The identification tag of claim 1 further comprising an identification panel hinged to the female portion, for folding in a direction normal the annular body.

12. The identification tag of claim 11 wherein the identification panel includes a UHF antenna.

13. The identification tag of claim 1, wherein the female portion is made of two superposed annular halves including a second half overmoulded to a first half.

14. The identification tag of claim 13 wherein the two superposed annular halves are made of corresponding materials compatible to form a satisfactory chemical bond upon said overmoulding.

15. The identification tag of claim 13 wherein the material of the overmoulding is more flexible than the material of the other annular half.

16. The identification tag of claim 13, wherein an annular antenna coil is trapped in a cavity between the two connected halves.

17. The identification tag of claim 13 wherein the head has a puncture tip which is embedded in the head by said over moulding.

* * * * *